United States Patent [19]
Crawford et al.

[11] Patent Number: 5,748,293
[45] Date of Patent: May 5, 1998

[54] ADJUSTABLE DOCUMENT HANDLER FOR REPRODUCTION APPARATUS

[75] Inventors: Jamie Crawford, Kirkella; Steven Powell, Aberdare; John Michael Walker, Lower Caldecote, all of United Kingdom

[73] Assignee: Xerox Corporation, Stamford, Conn.

[21] Appl. No.: 738,746

[22] Filed: Oct. 28, 1996

[30] Foreign Application Priority Data

Oct. 31, 1995 [GB] United Kingdom ............ 9522257

[51] Int. Cl.⁶ .................................................. G03B 27/62
[52] U.S. Cl. ........................................................ 355/75
[58] Field of Search .............................. 355/75, 76, 133

[56] References Cited

U.S. PATENT DOCUMENTS

| | | | |
|---|---|---|---|
| 4,114,236 | 9/1978 | Vandervort | 16/142 |
| 4,185,908 | 1/1980 | Taylor et al. | 355/75 X |
| 4,520,977 | 6/1985 | Holzhauser et al. | 248/201 |
| 5,104,244 | 4/1992 | Eldred et al. | 400/56 |
| 5,501,445 | 3/1996 | Lowman et al. | 271/145 |

FOREIGN PATENT DOCUMENTS

| 0573022 A2 A3 | 2/1993 | European Pat. Off. . |
|---|---|---|
| 57-070526 | 1/1982 | Japan . |

*Primary Examiner*—Fred L. Braun

[57] ABSTRACT

A document reproduction apparatus with an mounting mechanism for the document handler, which can be, for example, hinge/counter-balance mechanisms for supporting a document handler on the frame of the copier or other reproduction apparatus, in which the spacing of the document handler from the underlying imaging platen can be much more easily and accurately adjusted by the integral variable position adjustment mechanism including eccentrically faceted rotatable spacing cams. In the exemplary mechanism a first member for attachment to the document handler, is pivotally mounted about a pivot axis with a hinge pin to a second member for mounting to the frame of the copier, and has an adjustment system for adjusting the position of the first member relative to the pivot axis.

15 Claims, 7 Drawing Sheets

ADJUSTABLE DOCUMENT HANDLER FOR REPRODUCTION APPARATUS

Priority is claimed from British patent application No. GB9522257.6 filed Oct. 31, 1995.

Disclosed in the embodiment herein is a document reproduction apparatus with an improved, adjustable spacing, mounting mechanism for the document handler, which can be a hinge and counter-balance mechanism for counter-balancing support of the weight of a liftable platen-overlying document handling system, such as an automatic and/or recirculating document feeder for delivering successive documents to the imaging station (platen) of an optical or electronic image scanner or copier, or other document handler, wherein the spacing of the document handling system from the underlying imaging platen can be much more easily and accurately adjusted by the disclosed integral variable position adjustment mechanism. The present invention is not limited to the specific features of the specific disclosed embodiment.

A well known and long standing problem in reproduction systems is to provide reliable automatic document feeding to the imaging platen for document imaging, which typically requires a relatively large and heavy document handling apparatus to be correctly aligned over the imaging platen. Yet, it is important for such document handling apparatus to be easily liftable or pivotable up away from the platen by the operator to expose the platen for manual document placement on the platen, or for the clearance of document feeding jams. The prior art includes numerous patents and products on various hinges and/or counterbalances, separate or integral, for various copier, printer, scanner, or mutltifunction reproduction apparatus document handlers to provide such a function. However, many are fairly costly, and/or difficult to install or subsequently re-adjust, and/or do not sufficiently maintain alignment of the document handler relative to the platen. Especially since typically two such separate and widely spaced hinge-counterbalance units are required for mounting each document handler to the top of the frame of each reproduction apparatus.

However, and furthermore, the hinge and counterbalancing system or systems to provide these above-described features for the document handler should also allow for correct alignment and spacing of the bottom element or elements of the document handler relative to the platen, which it normally overlies, especially where an over-platen document transport belt system is provided in the document handler, where such over-platen spacing may be quite critical, and can change, as will be further discussed later herein. The system disclosed herein does so, with a low cost, accurate, reliable and simple to adjust variable spacing system, yet without sacrificing other desired features.

Savings in time, training and tools for repair and maintenance personnel to make adjustments of components at customer sites is of course an additional important cost savings, in many cases even more important than initial unit manufacturing costs. The document handler to platen spacing adjustment system disclosed in the embodiment herein provides simple plural but precise and presettable spacing adjustments which can be made in the field as well as in the factory. They do not even require measurements to be made by the tech rep in the field. Selectable preset precise spacing increments, and detents therefor, can be built in and automatically provided without any measurements.

Another disclosed feature of the embodiment herein is to provide an improved hinge and/or counter-balance mounting system for a document handler which is an improvement over known counter-balances used for that application. More particularly, to provide a less expensive such mounting system and one which also provides a faster, more straight-forward and accurate way of adjusting for the spacing desired for sheet feeding between the document handler and the upper surface of the imaging platen (referred to in the example below as the stack-up tolerance distance "t").

The embodiment disclosed hereinbelow provides an improved integral counter-balance and hinge mechanism for adjustably pivotally mounting a document handler on the frame of a copier or other imaging system. The specific mechanism in this specific embodiment example includes a first member for attachment to the document handler which is pivotally mounted about a pivot axis to a second member, the second member being provided with mounting means for mounting the second member to the frame of the copier, characterized by a simple but effective adjustment means for adjusting the position of the first member relative to the pivot axis.

Specific features disclosed in the specific embodiment disclosed herein include providing a document reproduction apparatus with a document imaging platen and with a document handler which is pivotally mounted to said document reproduction apparatus with a mounting mechanism so that said document handler normally closely overlies said imaging platen for normally engaging documents at said imaging platen with a lower portion of said document handler; the improvement in said mounting mechanism comprising a resettable stepwise spacing adjustment system integral said mounting mechanism for setting a selected spacing between said document handler and said imaging platen from discrete steps of different predetermined said spacings, said stepwise spacing adjustment system having a manual step selection system for easily manually selecting a selected one of a said plurality of discrete steps of preset spacings, to provide an improved said document handler mounting mechanism with simpler and more accurate adjustment and maintenance of a desired spacing between said document handler and said imaging platen.

Further specific features disclosed in The embodiment herein, individually or in combination, include those wherein said stepwise spacing adjustment system integral said mounting mechanism comprises at least one eccentrically faceted cam; and/or said stepwise spacing adjustment system integral said mounting mechanism comprises at least one plural sided cam; and/or wherein said stepwise spacing adjustment system integral said mounting mechanism comprises at least one plural sided cam having at least three different sides; and/or wherein said stepwise spacing adjustment system comprises plural identically faceted cams rotatable about an axis of rotation, with each said cam having plural cam faces, with respective said cam faces having different spacings from said axis of rotation of said cam; and/or further including a rotatable but normally constant position hinge pin providing an axis of pivotal rotation for said document handler, and wherein said cam is mounted on said hinge pin, and wherein limited rotation of said hinge pin rotates said cam between selected said facets thereof to change said selected spacing by vertically repositioning said hinge pin; and/or further including a rotatable but normally constant position hinge pin providing an axis of pivotal rotation for said document handler, and wherein said cam is mounted on said hinge pin, and wherein limited rotation of said hinge pin rotates said cams about said axis of rotation of said cams between selected said facets thereof to change said selected spacing; and/or wherein said mounting mechanism comprises a pair of spaced apart counter-balance mechanisms for supporting said document handler, each said counter-balance mechanism integrally including a first member adapted for mounting attachment to said document handler, a second member adapted for mounting attachment to said document reproduction apparatus, said second member being pivotally mounted about a pivot axis to said first member, said stepwise spacing adjustment system adjusting the position of said first member relative to said pivot axis in selectable discrete steps; and/or further including plural sided rotatable spacing cam members operatively associated with said pivot axis, wherein said stepwise spacing adjustment system adjusts said position of said first member relative to said pivot axis by selected partial rotation between selected sides of said rotatable spacing cam members; and/or further including plural sided rotatable spacing cam members, and a shaft defining said pivot axis, said shaft extending through opposing elongate slots in said first member, and said shaft having opposing accessible ends respectively mounting opposing identically plural sided said spacing cam members; and/or further including plural sided rotatable spacing cam members, and feet integrally formed with said first member, said feet supporting at least one said side of said plural sided rotatable spacing cam members.

As to specific components of the subject apparatus, or alternatives therefor, it will be appreciated that, as is normally the case, some such components are known per se in other apparatus or applications which may be additionally or alternatively used herein.

Various of the above-mentioned and further features and advantages will be apparent from the specific apparatus and its operation described in the example below, and the claims. Thus, the present invention will be better understood from this description of a specific embodiment, including the drawing Figures (approximately to scale) wherein:

Figure 1:
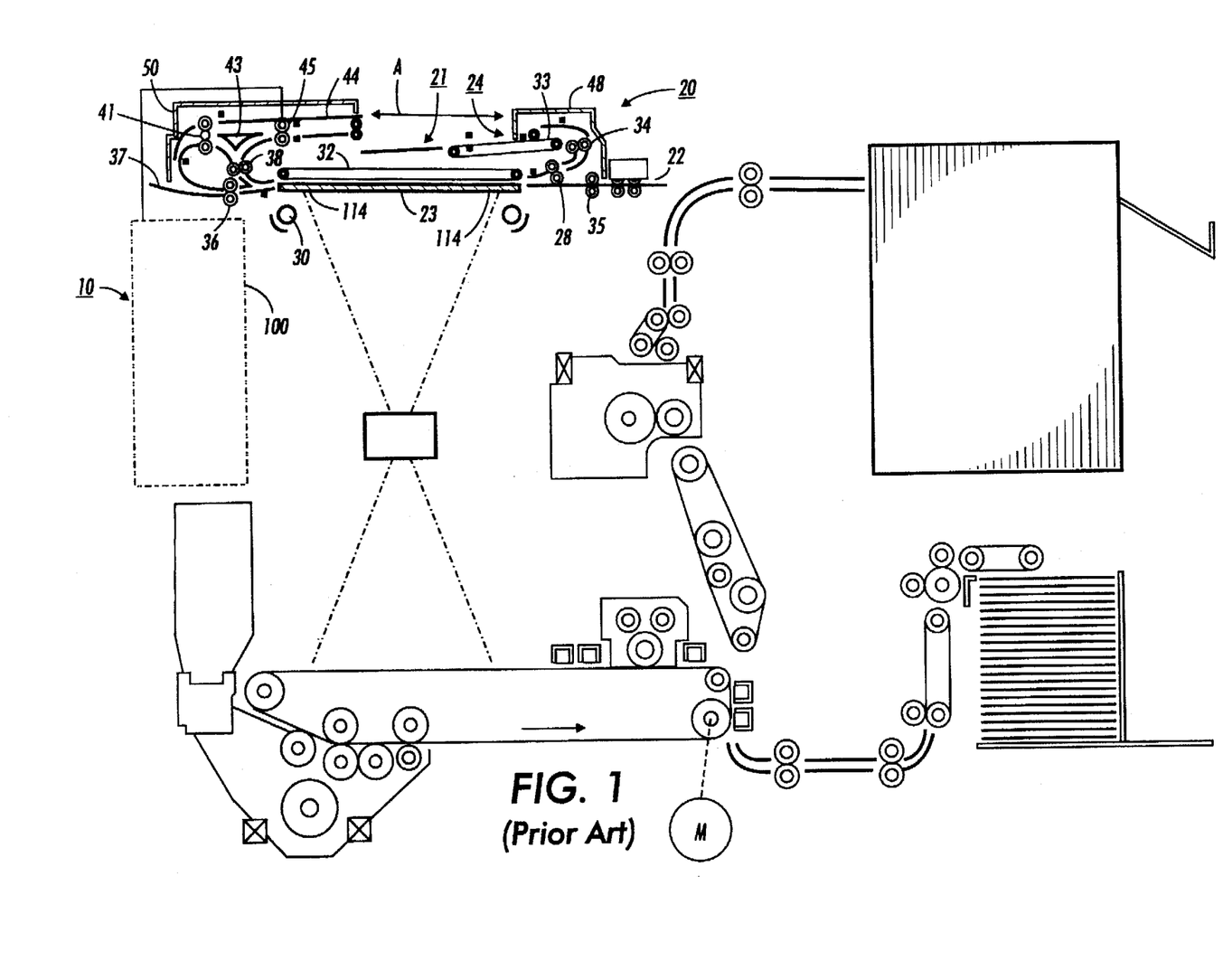
FIG. 1 is a schematic side view of a prior art exemplary prior art copier having an exemplary prior art recirculating document handler (RDH) with which an embodiment of the invention could be combined and employed.
Figure 3:
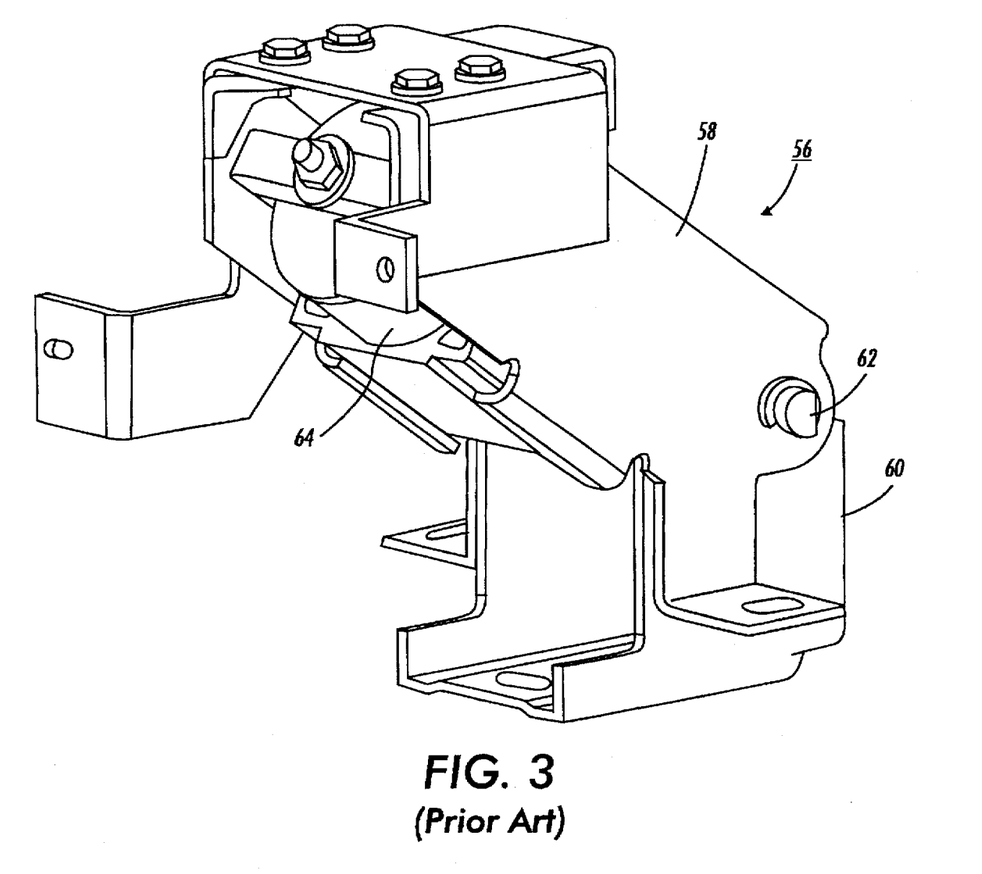
FIG. 3 is a more detailed, enlarged and perspective view of the counter-balance mechanism portion of FIG. 2.
Figure 4:
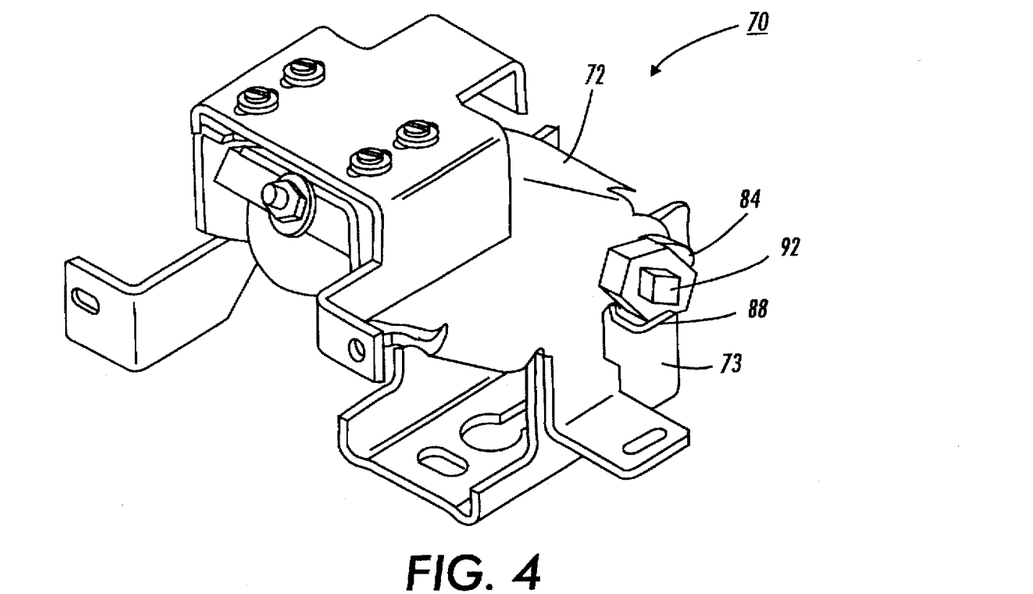
FIG. 4 illustrates in a perspective view an adjustable counter-balance mechanism providing one embodiment of the present invention.
Figure 5:
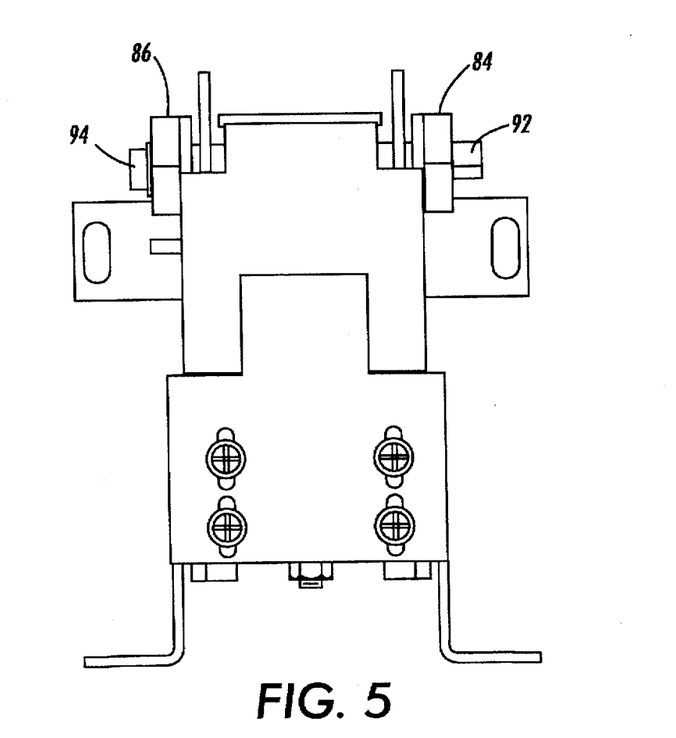
FIG. 5 is a top view of the mechanism of FIG. 4.
Figure 6:
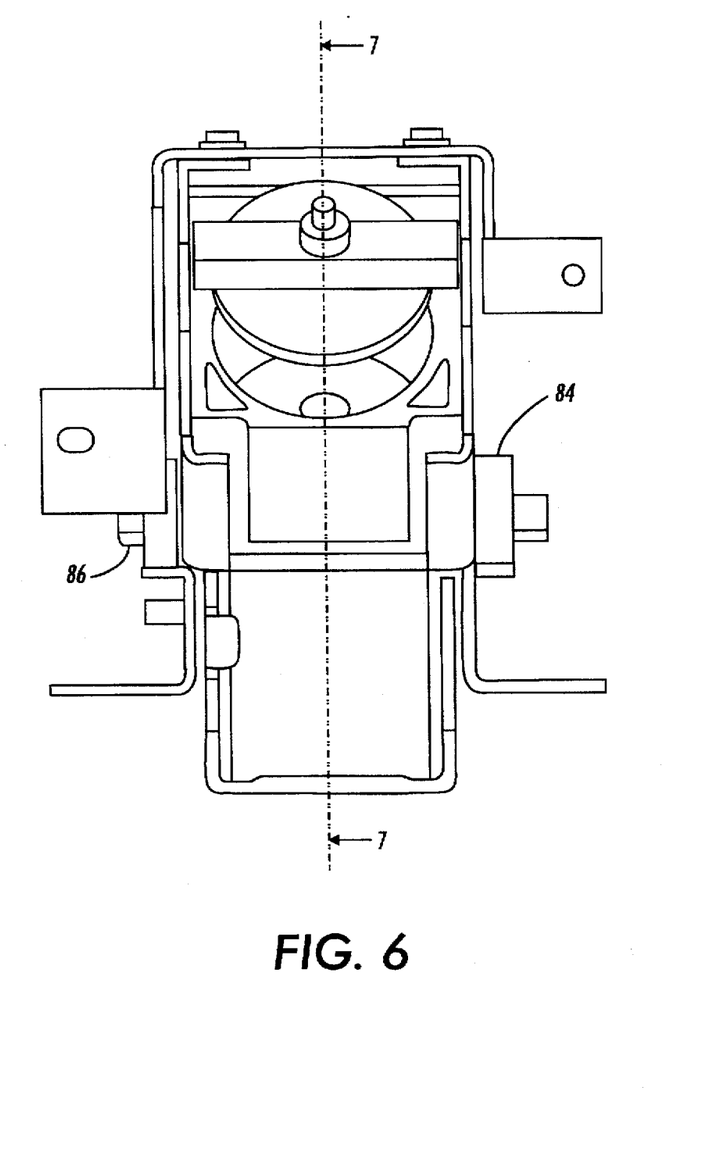
FIG. 6 is a front view of the mechanism of FIGS. 4 and 5.
Figure 7:
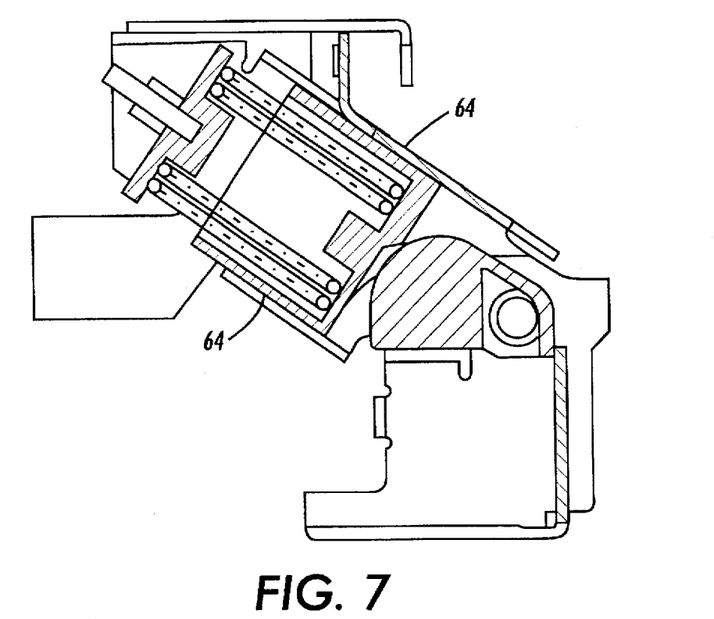
FIG. 7 is a cross-sectional view taken along the line 7—7 in FIG. 6.
Figure 8:
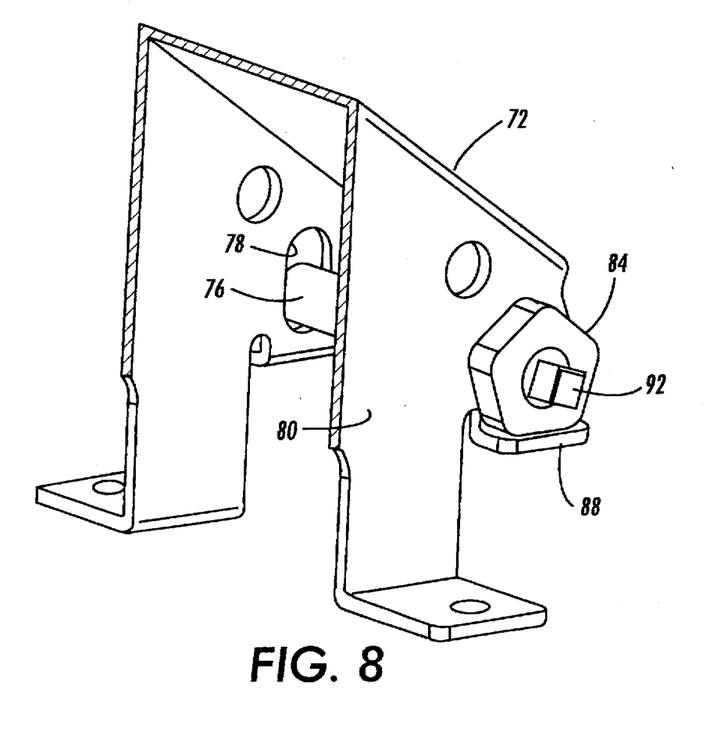
FIGS. 8 and 9 show, respectively in perspective and front views, selected portions of the upper member of the mechanism embodiment of FIGS. 4-7, so as to better illustrate the slots and shaft disposition thereof.
Figure 9:
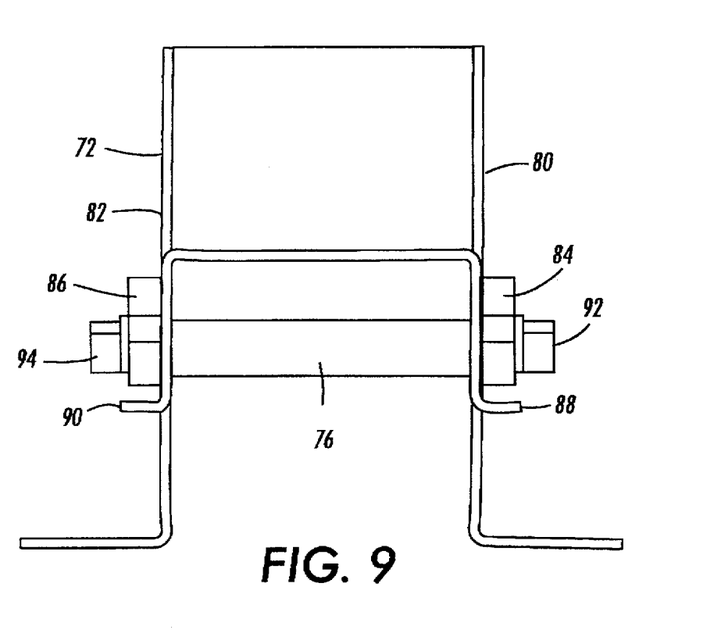

Referring now to the Figures, and first to the prior art portions examples, FIG. 1 shows one example of a copier 10 mounting one example of a known document handling (DH) system 20, with one example of a counter-balance mounting system therefore shown in FIG. 3. The invention is not limited to any of this detail. It will become further apparent that the basic principles of the below disclosed exemplary counter-balance system improvements are applicable to the variable spacing mounting with many other quite different such hinge type mountings of many other document handers of different weights and sizes. The exemplary copier 10 of FIG. 1 is conventional, and need not be described in any detail. Conventionally, the control of the copier 10 and all document placement and feeding by the DH 20 is by a control unit 100, typically a programmable microprocessor.

Figure 2:
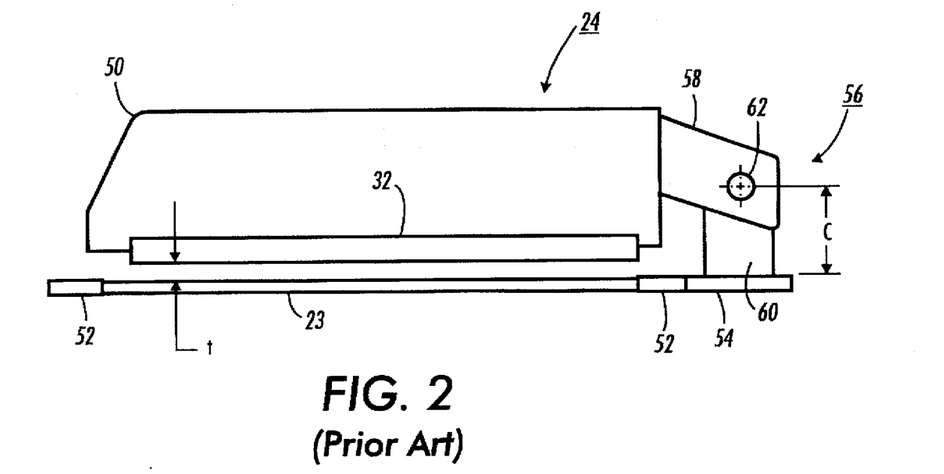
FIG. 2 is a schematic partly cut away and simplified side view of the prior art document handler shown in FIG. 1.

The particular example of a document handling system 20 shown here in FIGS. 1 and 2 comprises one example of a recirculating document handler (RDH) 24, which example is also shown and described in U.S. Pat. No. 5,501,445 issued Mar. 26, 1996 (R/93008). This RDH 24 has a recirculating input stacking tray 21 and provides for automatically transporting therefrom individual document sheets onto and over a conventional platen imaging station 23 of the copier 10, using a friction belt platen transport system 32 normally overlaying the platen 23. In this example, documents are fed one at a time from the bottom of a stack placed in the tray 21 by a driven belt 33 to a roller set 34 which direct documents to driven rollers 28 and then to the platen friction belt transport system 32 for imaging. Alternatively, documents from a different, semi-automatic, side input are fed from a shelf 22 through rollers 35 to the platen 23.

Documents exiting the platen belts transport system 32 after imaging are then directed via a decision gate (not shown) to either the lower rollers 36 or the upper rollers 38. Documents fed in from the semi-automatic shelf 22 are directed to an output tray 37 via the decision gate and rollers 36. Documents inputted from the tray 21 are directed by the gate to the rollers 38 from which they pass via a further decision gate 43 to either a pair of rollers 45 for feeding direct to the tray 21 or, if an inverting operation is required, to the lower pair of the three rollers 41. An inverted sheet can then be passed back to the tray 21 by the upper pair of the rollers 41. This arrangement of rollers and gates provides for either simplex or duplex documents imaging.

An optional moveable cover 44 may be provided to cover the tray 21 during a document handling operation as indicated by the movement arrow A. The document handler also has external covers 48, 50 which are substantially contiguous with the cover 44 when the latter is closed.

Referring now to FIG. 2, which is a view of the document handler 24 orthogonal to the plane of FIG. 1, for ease of illustration none of the internal components of the document handler 24 are illustrated in this view. The document handler 24 in FIG. 2, as in FIG. 1, is shown in its down, closed or horizontal position, that is, disposed over, and substantially parallel to, the platen glass 23. In practice, the platen transport belts 32, which are spring and/or gravity biased downwardly for the proper amount of frictional feeding engagement with the document sheet being fed over the platen, are essentially in contact with the platen glass 23 when there is no sheet disposed therebetween.

In FIG. 2 however, the belts 32 are shown at a small distance "t" spaced above the platen glass 23. This distance "t" represents a tolerance stack-up distance between the platen glass 23 and the belts 32 for when a sheet is present therebetween. A variation in this tolerance stack-up distance "t" between the platen glass and the document handler can cause document misfeeding or a skewed or miss-registered position of the document relative to the platen glass, which can result in skewed or miss-registered copies. This tolerance stack-up distance "t" is dependent on a number of factors or parameters, including, for example, the extent of wear on the belts 32 and the weight and/or backing plate or rollers spring pressure and/or weight with which the belts are biased downwardly on a document overlying the platen glass 23.

Referring in more detail to FIG. 2, the document handler 24 is shown pivotally supported on a top frame 54 of the copier by means of a counter-balance mechanism generally indicated by the numeral 56 and shown in more detail in FIG. 3. This mechanism 56 consists of an upper member 58, one end of which is pivotally supported, about a pivot point 62, to a lower member 60 vertically mounted on the frame 54. The other end of the upper member 58, remote from the pivot point 62, is attached to the main body of the document handler 24. Thereby, the mechanism 56 is providing a mounting device allowing the document handler to be pivoted towards and away from the platen 23. Two of them are used.

This known counter-balance mechanism 56, as illustrated in FIG. 3, employs a captive counterbalance spring 64 to bias the entire document handler unit 20 to an "up" position when it is desired to place documents manually on the platen glass 23, by counterbalancing the weight of the document handler unit. As the document handler is pivoted downwardly about the pivot 62 towards the glass platen 23, a position is eventually reached when the document handler falls freely but with limited force into its horizontal or "down" position overlying the imaging platen 23. However, in this prior art mechanism 56, there is no provision for any adjustment or compensation should the tolerance stack-up distance "t" vary.

Figure 11:
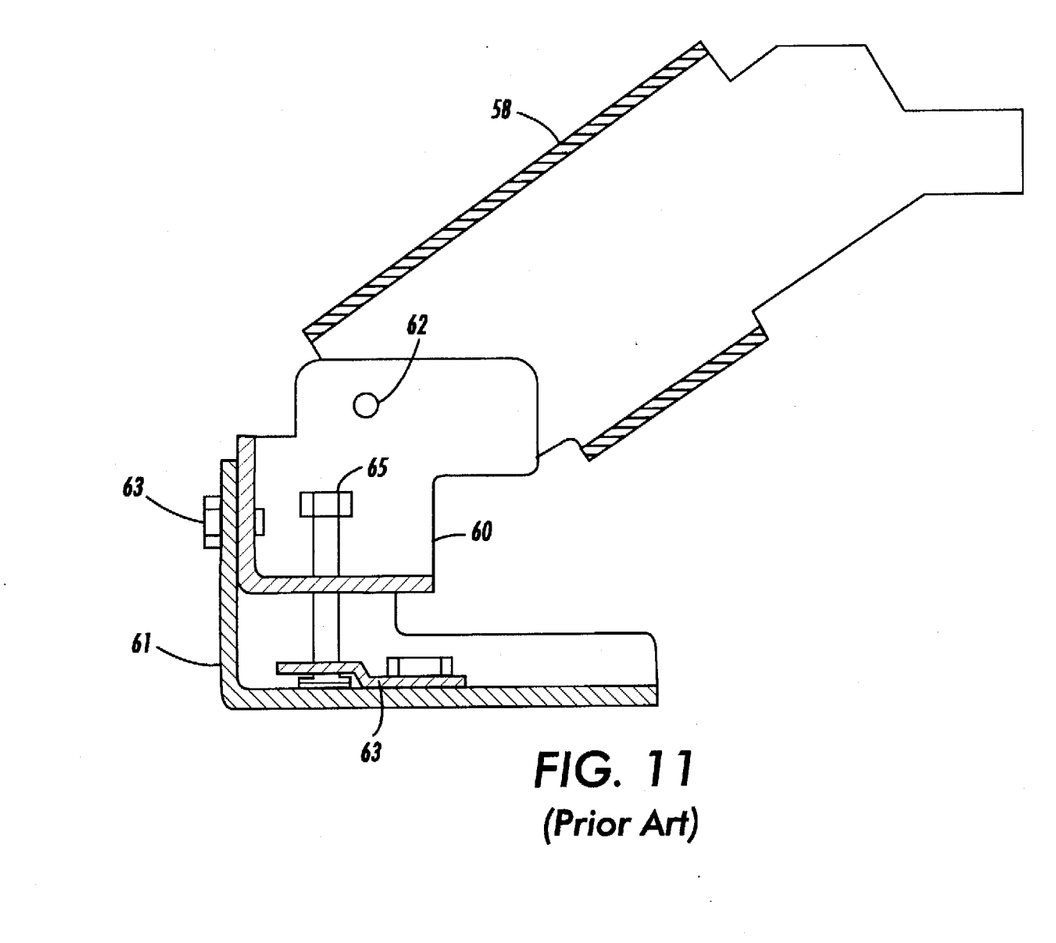
FIG. 11 is a simplified cross-sectional view of another prior art counter-balance mechanism.

Another known form of prior art counter-balance, shown in simplified cross-section in FIG. 11, utilizes an arrangement in which the lower member 60 of the counter-balance is held, and may be adjusted within, a third member 61. The adjustment in the height of the upper member 58 is achieved by loosening a locking screw 63, used for securing the lower member to the third member 61, and then turning a jack-screw 65 which passes through the base of the lower member 60. The lower end of the jack-screw 65 is held in position by means of a bracket 63 bolted to the floor of the third member 61. The turning of the jack-screw 65 causes an adjustment in height between the lower member 60 and the third member 61. The lower member 60 is connected to the upper member 58 at the fixed pivot 62, there being no means of height adjustment between the upper and lower members 58,60, so that raising the lower member 60 causes the upper member 58 to raise by the same height.

This previously known arrangement of FIG. 11, although providing some means of adjusting to compensate for the tolerance stack-up distance "t", is more complex than a counter-balance having just two main body members and, therefore, is more expensive to manufacture. In addition, to carry out the needed spacing adjustments with this mechanism can be very difficult to execute accurately, and can be quite time consuming. Furthermore, there are no means provided for predetermining or monitoring the exact amount of the adjustment that has actually been made. These disadvantages are greatly exacerbated by the fact that normally two separate and spaced such counter-balances are needed to support a document-handler. If the two separate counter-balances are not adjusted by exactly the same amount, the resultant belt transport normal force and/or spacing differences in different areas thereof can cause difficulties of varying degree in the paper feeding process over the platen, especially, causing skewing of the paper during the feeding process. There is thus a need to provide a far more accurate way of adjusting the height of the counter-balance mechanism.

Turning now to the subject improvements exemplary embodiment, FIGS. 4 to 10 show in detail one specific embodiment in accordance with the present invention, in this example a counter-balance mechanism 70. It will be appreciated that the invention is not limited to this specific embodiment 70. This illustrated mechanism 70 consists of an upper steel member 72 pivotally mounted to a lower steel member 73 about the longitudinal axis of a pivot shaft 76. This pivot shaft 76 is most clearly seen in FIGS. 8 and 9. The shaft 76 here is fixed relative to the lower member 73 but arranged to be movable relative to the upper member 72. To provide this relative movement facility the upper member 72 is provided with a pair of opposed slots 78 formed in its sidewalls 80, 82. The ends of the shaft 76 each extend through a respective one of the slots 78 outwardly from the respective sidewall 80, 82. Two identical plural-sided cams 84 (see especially FIG. 10) and 86 are mounted to each end of the shaft 76. Each cam 84, 86 has each of its sides spaced at differing distances from its respective center-point or mounting axis. The upper member 72 is provided with two extensions, defining feet 88, 90, integral with the sidewalls. One side of each of the cams 84, 86 rests on and is supported by a respective foot 88, 90.

To make an adjustment to the document handler to allow for a change in the tolerance stack-up distance "t", one simply rotates by a small angle the shaft 76 to change the selected side or "flat" of both bolt-like cams 84, 86 which bears on feet 88, 90. In this way, the shaft 76, which is constrained but allowed to move vertically in the direction of the slots 78, is raised or lowered, relative to the upper member 72. The distance through which the shaft 76 is repositioned up or down is equal to the difference between the distance from the newly engaged side of the cam to the cam center-point versus the distance from the previously engaged cam side to the cam center-point. The cam 84 example shown in FIG. 10 has five sides or flats, with five different radial spacings, and thus five possible step adjustments. It has been found that a suitable total range of adjustment can be about 2 mm, with each of such 5 step adjustments being about 0.5 mm.

Figure 10:
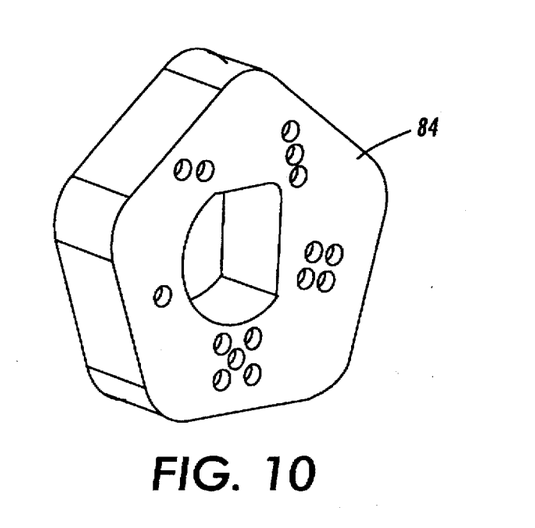
FIG. 10 shows in perspective one of the special spacing adjustment cams per se, including its asymmetric center-hole, of the embodiment of FIGS. 4-9.

Although the cam 84, 86 as shown in FIG. 10 is pentagonal, it will be appreciated that cams having different numbers of sides, although preferably at least three, can be adopted, depending on the total adjustment and/or the desired step sizes required for the application. The number of adjustments available depends on the number of sides provided on the cams 84, 86. The step sizes can also vary.

Thus it may be seen that although the shaft 76 is fixed relative to the lower member 73, it is variable in spacing with the variable cam face settings. These resettings are in plural or multiple precise and preset steps relative to the upper member 72 (or vice-versa, in a different embodiment) so that the height "c" (see FIG. 2) of the hinge portions of the counter-balances, and thus the spacing "t" of the document handler from the platen, may be accurately and easily adjusted, in this example by a simple shaft 76 partial rotation. It may be seen that these spacing adjustments (set or reset) here are both faster to make and more straightforward. They are in precise, preset, known increments, with an integral detent system holding them in their selected position as described below. This in turn leads to substantial savings in maintenance time, and therefore substantial savings in maintenance costs associated with copier or scanner servicing.

The cams 84, 86 are prevented from otherwise rotating, as in the normal operation of the document handler, by the resolved component of the counter-balance spring force from the captive spring mechanism 64 within the counter-balance. That force acts on the shaft 76 in the direction normal to the plane of the feet 88, 90, and prevents the cams from rotating. That provides an automatic detent system to prevent the selected preset cam spacing adjustment setting from changing except by an intended deliberate change as described above. The captive spring mechanism is, for example, a compression spring exerting a force of, for example, 1400 Newtons at maximum compression when the document handler is in its "down" position, i.e., in contact with the platen, for an exemplary document handler weighing approximately 12.4 Kg. The force acting between the contacting cam surface and the feet 88, 90 is therefore considerable. However, been found to be surprisingly easy to rotate the shaft 76, when a spacing adjustment is desired, simply by manually slightly rotating it with a small wrench or spanner applied to one of the square ends 92, 94 formed on the ends of the shaft 76.

Besides the user simplicity of simply selecting a facet of these special eccentrically multifaceted cams 84, 86 to make the desired spacing adjustment, this mechanism and process also provides a precision in the adjustment of the height of the document handler which is difficult to achieve in the prior art. It has also been found surprisingly that cams such as 84,86 suitable for such use can even be molded from suitable plastic based materials, such as 60% glass-filled nylon.

As another feature, the mounting center-hole of each of the cams 84, 86 here is asymmetric as shown in FIG. 10 and thereby keyed to shaft 76. This ensures that even with two (or more) such cams located on the shaft 76, as here, the orientation of each cam relative to the shaft 76 will be identical, i.e., there is no possibility of miss-assembly during manufacture, or of presenting differently dimensioned cam faces on the same hinge unit when its shaft 76 is rotated to change the document handler spacing "t".

While the embodiment disclosed herein is preferred, it will be appreciated from this teaching that various alternatives, modifications, variations or improvements therein may be made by those skilled in the art, which are intended to be encompassed by the following claims:

We claim:

1. In a document reproduction apparatus with a document imaging platen and with a document handler which is pivotally mounted to said document reproduction apparatus with a mounting mechanism so that said document handler normally closely overlies said imaging platen for normally engaging documents at said imaging platen with a lower portion of said document handler; the improvement in said mounting mechanism comprising;

a resettable stepwise spacing adjustment system integral said mounting mechanism for setting a selected spacing between said document handler and said imaging platen from a plurality of discrete steps of different predetermined said spacings, said stepwise spacing adjustment system having a manual step selection system for easily manually selecting a selected one of said plurality of discrete steps of preset spacings, to provide an improved said document handler mounting mechanism with simpler and more accurate adjustment and maintenance of a desired spacing between said document handler and said imaging platen.

2. The improved document handler mounting mechanism of claim 1, wherein said stepwise spacing adjustment system integral said mounting mechanism comprises at least one eccentrically faceted cam.

3. The improved document handler mounting mechanism of claim 2, further including a rotatable but normally constant position hinge pin providing an axis of pivotal rotation for said document handler, and wherein said cam is mounted on said hinge pin, and wherein limited rotation of said hinge pin rotates said cam between selected said facets thereof to change said selected spacing by vertically repositioning said hinge pin.

4. The improved document handler mounting mechanism of claim 1, wherein said stepwise spacing adjustment system integral said mounting mechanism comprises at least one plural sided cam having at least three different sides.

5. The improved document handler mounting mechanism of claim 1, wherein said stepwise spacing adjustment system comprises plural identically faceted cams rotatable about an axis of rotation, with each said cam having plural cam faces, with respective said cam faces having different spacings from said axis of rotation of said cam.

6. The improved document handler mounting mechanism of claim 1, wherein said stepwise spacing adjustment system integral said mounting mechanism comprises at least one plural sided cam.

7. The improved document handler mounting mechanism of claim 6, further including a rotatable but normally constant position hinge pin providing an axis of pivotal rotation for said document handler, and wherein said cam is mounted on said hinge pin, and wherein limited rotation of said hinge pin rotates said cam about said axis of rotation of said cam between selected sides thereof to change said selected spacing.

8. The improved document handler mounting mechanism of claim 1, wherein said mounting mechanism comprises a pair of spaced apart counter-balance mechanisms for supporting said document handler, each said counter-balance mechanism integrally including:

a first member adapted for mounting attachment to said document handler, a second member adapted for mounting attachment to said document reproduction apparatus, said first member being pivotally mounted about a pivot axis to said second member, and said stepwise spacing adjustment system adjusting the position of said first member relative to said pivot axis in selectable discrete steps.

9. The improved document handler mounting mechanism of claim 8, further including plural sided rotatable spacing cam members operatively associated with said pivot axis, wherein said stepwise spacing adjustment system adjusts said position of said first member relative to said pivot axis by selected partial rotation between selected sides of said rotatable spacing cam members.

10. The improved document handler mounting mechanism of claim 8, further including plural sided rotatable spacing cam members, and a shaft defining said pivot axis, said shaft extending through opposing elongate slots in said first member, and said shaft having opposing accessible ends respectively mounting opposing identically plural sided said spacing cam members.

11. The improved document handler mounting mechanism of claim 8, further including plural sided rotatable spacing cam members, and feet integrally formed with said first member, said feet supporting at least one said side of said plural sided rotatable spacing cam members.

12. The improved document handler mounting mechanism of claim 8, further including plural plural-sided rotatable spacing cams with a center-point, wherein each side of each said spacing cam is preset at differing distances from the respective said center-point of said cam.

13. The improved document handler mounting mechanism of claim 8, further including at least one plural-sided rotatable spacing cam with an asymmetrical mounting center-hole therethrough.

14. The improved document handler mounting mechanism of claim 8, further including plural sided rotatable spacing cam members operatively associated with said pivot axis, wherein said stepwise spacing adjustment system adjusts said position of said first member relative to said pivot axis by selected partial rotation between selected sides of said rotatable spacing cam members about a cam center point and wherein each side of each said spacing cam is preset at differing distances from the respective said center-point of said cam.

15. The improved document handler mounting mechanism of claim 1, further including automatic detent means for maintaining said stepwise spacing adjustment system in a selected said discrete step of preset spacings.

\* \* \* \* \*